(12) United States Patent
Omori

(10) Patent No.: US 8,891,143 B2
(45) Date of Patent: Nov. 18, 2014

(54) SHEET FEEDING DEVICE, IMAGE FORMING APPARATUS, AND IMAGE SCANNING APPARATUS

(75) Inventor: Akira Omori, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/811,897

(22) PCT Filed: Jul. 28, 2011

(86) PCT No.: PCT/JP2011/004290
§ 371 (c)(1),
(2), (4) Date: Jan. 23, 2013

(87) PCT Pub. No.: WO2012/017624
PCT Pub. Date: Feb. 9, 2012

(65) Prior Publication Data
US 2013/0120810 A1    May 16, 2013

(30) Foreign Application Priority Data
Aug. 6, 2010  (JP) ................. 2010-177680

(51) Int. Cl.
*H04N 1/04*  (2006.01)
*B65H 3/06*  (2006.01)
*H04N 1/00*  (2006.01)
*B65H 3/56*  (2006.01)
*B65H 3/46*  (2006.01)

(52) U.S. Cl.
CPC .......... *B65H 3/46* (2013.01); *B65H 2405/1136* (2013.01); *B65H 3/0684* (2013.01); *B65H 3/0669* (2013.01); *H04N 1/00625* (2013.01); *B65H 3/565* (2013.01); *B65H 2403/42* (2013.01); *B65H 2403/512* (2013.01); *B65H 2301/512125* (2013.01); *B65H 2403/53* (2013.01)
USPC ............ 358/498; 358/497; 358/474; 358/496

(58) Field of Classification Search
USPC ................... 358/498, 497, 474, 496
See application file for complete search history.

(56) References Cited

U.S. PATENT DOCUMENTS

| | | | |
|---|---|---|---|
| 3,645,527 A | 2/1972 | Gates | |
| 2003/0201596 A1 | 10/2003 | Teo | |
| 2005/0051945 A1* | 3/2005 | Kang | ............................ 271/121 |
| 2008/0002010 A1* | 1/2008 | Nakashima | ................... 347/104 |

FOREIGN PATENT DOCUMENTS

| | | |
|---|---|---|
| CN | 2320596 Y | 5/1999 |
| CN | 101174114 A | 5/2008 |
| JP | 7-069468 A | 3/1995 |
| JP | 03837940 B2 | 10/2006 |

* cited by examiner

Primary Examiner — Houshang Safaipour
(74) *Attorney, Agent, or Firm* — Canon USA, Inc., IP Divison

(57) ABSTRACT

A sheet feeding device includes a sheet supporting portion, a sheet feeding portion, and a movable regulating portion. The sheet feeding portion feeds a sheet bundle uppermost sheet. The movable regulating portion is disposed downstream of the sheet bundle in a sheet feeding direction such that the movable regulating portion is tiltable between a regulation position and a regulation release position. While the movable regulating portion regulates the sheet bundle movement in the regulation position, the sheet feeding portion forms a loop in the uppermost sheet between the sheet feeding portion and the movable regulating portion, the movable regulating portion is moved to the regulation release position after loop formation to remove the formed loop, and the movable regulating portion is returned to the regulation position after loop removal such that the movable regulating portion raises the uppermost sheet leading end to separate the uppermost sheet from other sheets.

26 Claims, 14 Drawing Sheets

SHEET FEEDING DEVICE, IMAGE FORMING APPARATUS, AND IMAGE SCANNING APPARATUS

CROSS REFERENCE TO RELATED APPLICATIONS

This application is a National Stage filing of PCT application No. PCT/JP2011/004290, filed Jul. 28, 2011, which claims priority from Japanese Patent Application No. 2010-177680, filed Aug. 6, 2010, all of which are hereby incorporated by reference herein in their entirety.

TECHNICAL FIELD

The present invention relates to a sheet feeding device that feeds a sheet to an image forming apparatus, such as a printer or a copier, and a sheet feeding device that feeds a sheet (document) to an image scanning portion of an image scanning apparatus.

BACKGROUND ART

In general, an image forming apparatus, such as a printer or a copier, and an image scanning apparatus each include a sheet feeding device that separates sheets (documents) stacked on, for example, a sheet feed cassette or a sheet feed tray on a one-by-one basis and feeds the separated sheet to an image forming portion or a document scanning portion.

Such a sheet feeding device includes a separating portion based on any of various methods for separation in order to separate sheets one by one. For example, air separation and frictional separation have been known. According to the former method, air is blown onto stacked sheets to separate the sheets and, after that, the sheets are conveyed one by one while being sucked. According to the latter method, sheets are separated using a sheet feed roller, a friction force applied by a frictional member, and a friction force between sheets. In addition, slope separation has also been known. According to this method, the leading edges of sheets are allowed to abut against a separation slope to separate the sheets.

A configuration proposed as a special separation method is disclosed in PTL 1. While part of the uppermost sheet of a stack of sheets is being pressed downward by a pressing member, a sheet feed roller, positioned downstream of the pressing member, abutting against the sheet feeds the sheet in the direction opposite to a sheet feeding direction. Accordingly, the uppermost sheet is moved backward while a loop is being formed in the sheet and the leading edge of the sheet is moved from the lower side of the sheet feed roller to the upper side thereof. Thus, the sheet is separated and fed.

In recent years, there have been increasing needs to install and use a small and low-cost printer or copier on a table at office or home. Related-art printers and copiers have not sufficiently met the needs. An approach to meeting the needs is to reduce the cost and size of a sheet feeding device provided for a printer or copier.

As regards a related-art air separation sheet feeding device, it requires a device for generating air pressure, thus resulting in an increase in size of the feeding device. Accordingly, it is difficult to use this feeding device in small printers and copiers. As regards related-art frictional separation sheet feeding devices, for example, a separation pad type requires an intermediate plate unit for stacking sheets and pressing the sheets against the sheet feed roller to generate sheet feed pressure, and a separation pad in addition to a sheet feed roller. A retard separation type requires a pick roller and a retard roller in addition to the intermediate plate unit and the sheet feed roller. Accordingly, such frictional separation sheet feeding devices are generally expensive, although lower than the air separation type.

The slope separation sheet feeding device is inexpensive and it is relatively easy to reduce the size of the feeding device but ease of use for a user is poor. Specifically, upon setting a bundle of sheets, the leading edges of the set sheets are allowed to abut against the separation slope. Accordingly, the sense of abutment is very small. In some cases, the sheets are set while the leading ends thereof are lying over the separation slope by accident. In this case, disadvantageously, multiple-sheet feeding (feeding of overlapping sheets) often occurs during a sheet feeding operation.

A sheet feeding device disclosed in PTL 1 requires a first sheet feed roller and a second sheet feed roller, a sensor that detects the shift of a sheet from the lower side to the upper side of the first sheet feed roller, a mechanism that swings the first sheet feed roller after detection of the shift, and a movable mechanism that presses a bundle of sheets. In addition, an upward space is needed because a loop to be formed in a sheet is large. Disadvantageously, the cost and size of such a sheet feeding device are not sufficiently reduced.

CITATION LIST

Patent Literature

PTL 1: Japanese Patent Laid-Open No. 7-69468

SUMMARY OF INVENTION

The present invention provides a small and low-cost sheet feeding device with ease of setup of sheets.

According to an aspect of the present invention, a sheet feeding device includes a sheet supporting portion configured to support a sheet, a sheet feeding portion configured to feed the uppermost sheet of a bundle of sheets supported by the sheet supporting portion, and a movable regulating portion disposed downstream of the bundle of sheets supported by the sheet supporting portion in a sheet feeding direction such that the movable regulating portion is tiltable between a regulation position where the portion regulates the movement of the bundle of sheets in the sheet feeding direction and a regulation release position where the portion falls forward from the regulation position to release the regulation of the bundle of sheets. While the movable regulating portion regulates the movement of the bundle of sheets in the regulation position, the sheet feeding portion is operated to form a loop in the uppermost sheet between the sheet feeding portion and the movable regulating portion. The movable regulating portion is moved to the regulation release position after formation of the loop to remove the loop formed in the uppermost sheet. The movable regulating portion is returned to the regulation position after removal of the loop such that the movable regulating portion raises the leading end of the uppermost sheet so as to separate the uppermost sheet from the other sheets.

DESCRIPTION OF EMBODIMENTS

First Embodiment

Figure 13:
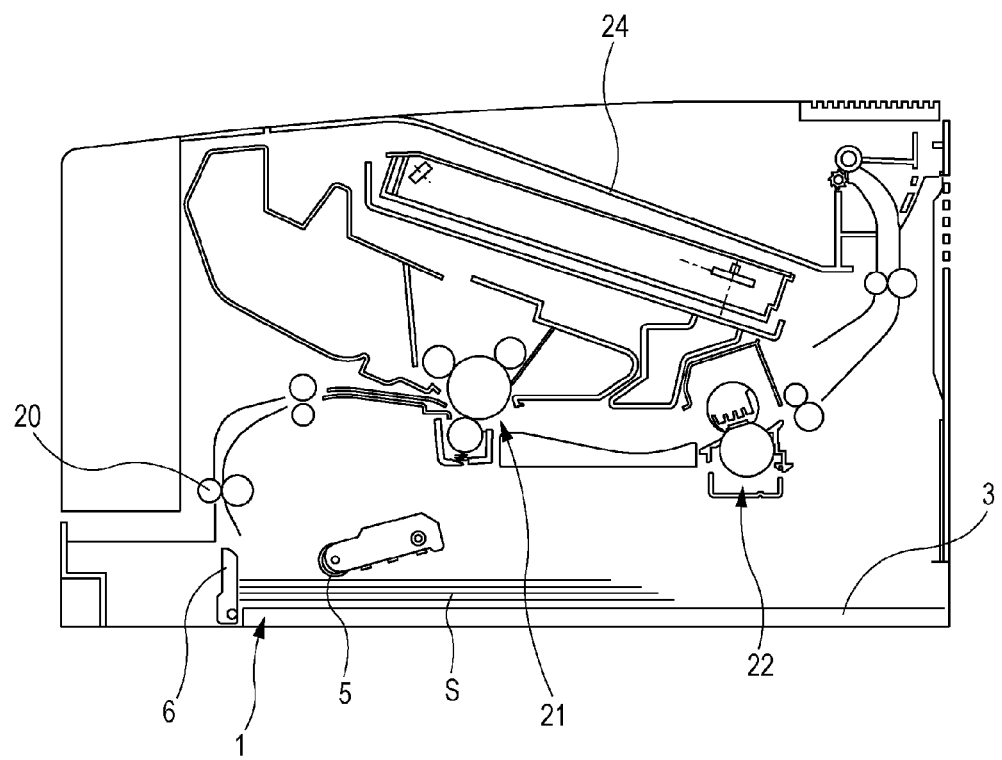
FIG. 13 is a schematic diagram of an image forming apparatus according to another aspect of the present invention.

The entire configuration of an image forming apparatus including a sheet feeding device according to a first embodiment of the present invention will be described with reference to FIG. 13. The sheet feeding device, indicated at 1, positioned in lower part of the image forming apparatus, includes a sheet stacking portion (sheet feed tray) 3, serving as a sheet supporting portion configured to support a sheet. A bundle of sheets S supported by the sheet stacking portion 3 are separated and fed one by one to a sheet conveying path in a main body of the image forming apparatus (hereinafter, referred to as the "main body of the apparatus") by a sheet feed roller 5 and a movable wall 6, serving as a movable regulating portion which will be described later and constitutes a feature of the present invention. In the sheet conveying path in the main body of the apparatus, an intermediate conveying roller 20 is disposed. The sheet is conveyed to an image forming portion 21 on the downstream side by the intermediate conveying roller 20. In the image forming portion 21, a developed toner image is transferred to the sheet and the sheet is then conveyed to a fixing portion 22. In the fixing portion 22, heat and pressure are applied to the sheet with the transferred toner image, thus fixing the toner image to the sheet. The sheet with the fixed toner image is discharged onto a sheet output tray 24.

Figure 1:
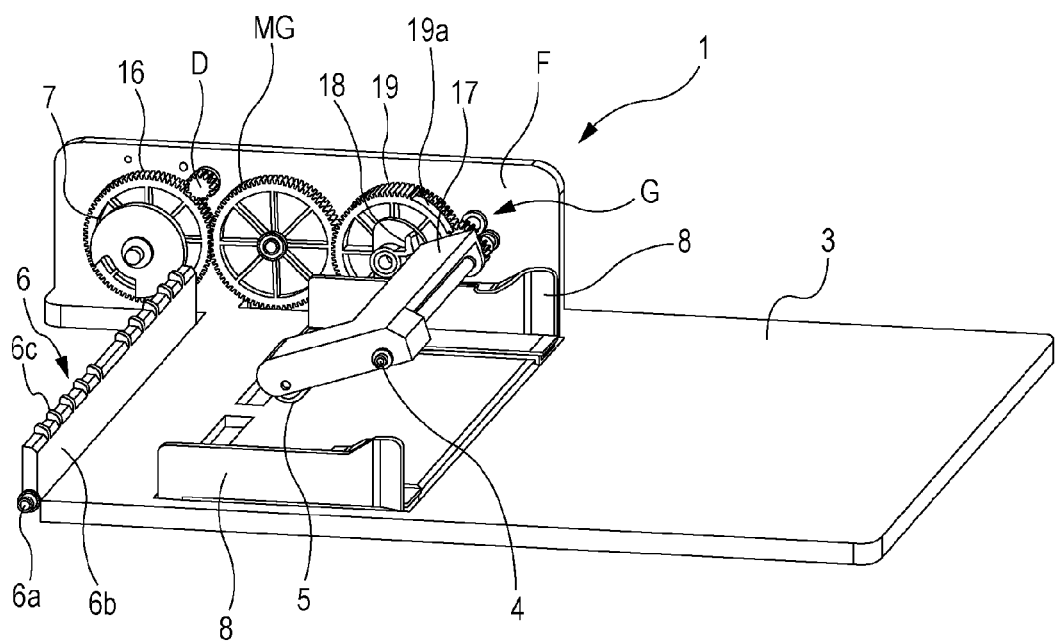
FIG. 1 is a perspective view of a sheet feeding device according to a first embodiment.
Figure 2A:
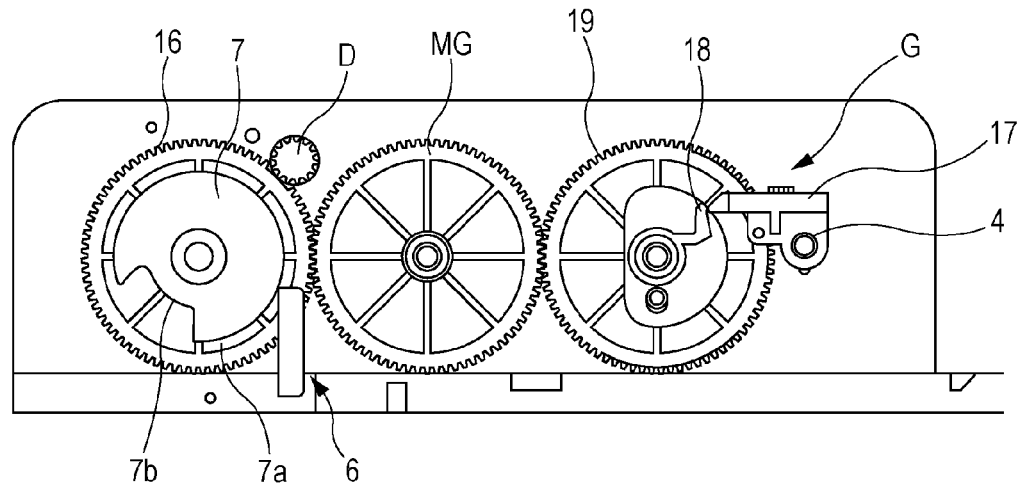
FIG. 2A is a front view of a driving transfer mechanism included in the sheet feeding device of FIG. 1.
Figure 2B:
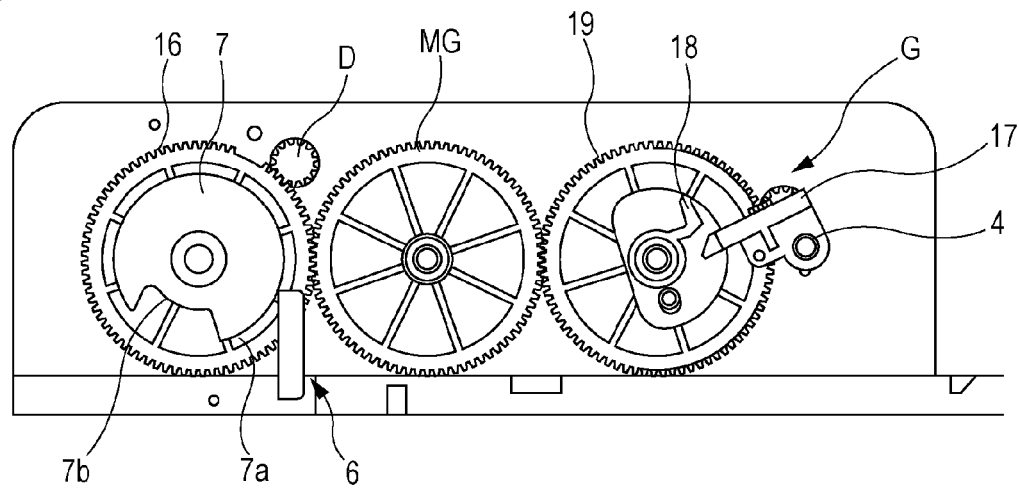
FIG. 2B is a front view of the driving transfer mechanism included in the sheet feeding device of FIG. 1.
Figure 2C:
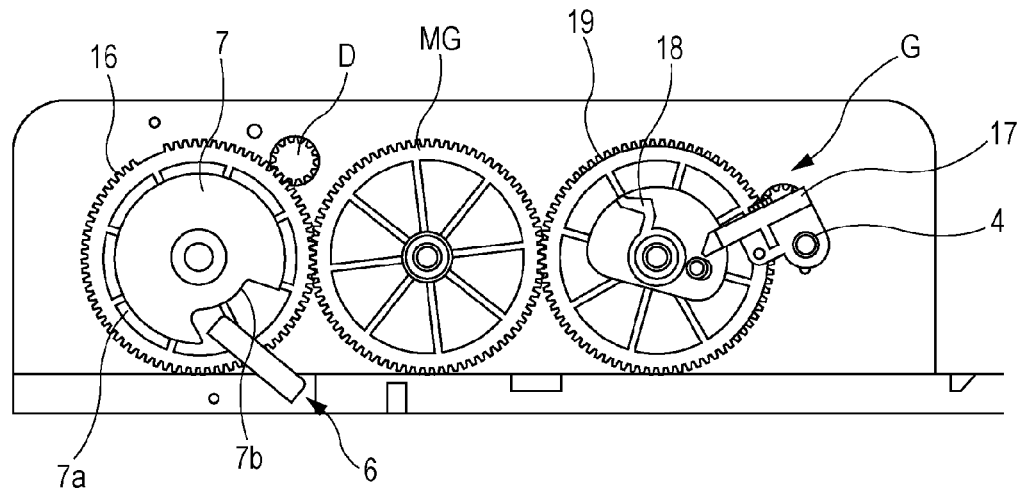
FIG. 2C is a front view of the driving transfer mechanism included in the sheet feeding device of FIG. 1.

FIG. 1 is a perspective view of the sheet feeding device 1 according to the first embodiment. FIGS. 2A to 2C are front views of a driving transfer mechanism. The configuration of the sheet feeding device 1 will be described with reference to FIGS. 1 to 2C. In the sheet stacking portion 3, serving as the sheet supporting portion on which a bundle of sheets is set, width regulating members 8 configured to regulate the positions of the sheets in the width direction thereof is disposed such that the members are movable in the width direction orthogonal to a sheet feeding direction. The sheet stacking portion 3 is fixed to the main body of the apparatus such that a surface supporting the sheets is substantially horizontally disposed.

The sheet feed roller 5, serving as a sheet feeding portion, is disposed above the sheet stacking portion 3. The sheet feed roller 5 is held by a holding portion 17 which is supported pivotably about a pivot shaft 4 attached to a frame F at the back of the main body of the apparatus. The holding portion 17 allows the sheet feed roller 5 to be vertically swingable about the pivot shaft 4. The frame F is provided with the driving transfer mechanism configured to drive components of the sheet feeding device 1. The driving transfer mechanism includes a holding-portion drive gear 19 for driving a lifting cam 18, which will be described in detail later, allowing the holding portion 17 to pivot, a regulating-portion drive gear 16 for driving a tilting cam 7 allowing the movable wall 6 to tilt, and an intermediate gear MG disposed between the holding-portion drive gear 19 and the regulating-portion drive gear 16. A driving force supplied from a motor (not illustrated), serving as a driving source, is transferred from a driving transfer gear D through the regulating-portion drive gear 16 to the driving transfer mechanism.

The driving force is transferred from the holding-portion drive gear 19 of the driving transfer mechanism through a drive gear train G to the sheet feed roller 5, serving as a sheet feeding portion, so that the sheet feed roller 5 is rotated. The holding portion 17 allows the sheet feed roller 5 to be swung downward and be brought into contact with the upper surface of the sheet bundle supported by the sheet stacking portion 3. The sheet feed roller 5 is rotated through the drive gear train G, so that the uppermost sheet, indicated at Sa, is fed. The holding-portion drive gear 19 has a tooth surface which meshes with the drive gear train G and which has a notch 19a. When the notch 19a faces the drive gear train G, the rotation of the sheet feed roller 5 is temporarily stopped because the driving force is not transferred to the sheet feed roller 5.

Referring to FIG. 2A, the holding portion 17 is configured to be vertically pivoted by rotation of the lifting cam 18 in sliding contact with one end of the holding portion 17. The lifting cam 18 is fixed to the holding-portion drive gear 19 which meshes with the drive gear train G. When the driving force rotates the holding-portion drive gear 19 through the drive gear train G, the lifting cam 18 is rotated to vertically pivot the holding portion 17. Vertical pivoting of the holding portion 17 allows the sheet feed roller 5 to be vertically swung. FIG. 2B illustrates a state where the sliding contact between the lifting cam 18 and the holding portion 17 is broken and the downwardly moved sheet feed roller 5 is in contact with the upper surface of the sheet bundle supported by the sheet stacking portion 3. When the holding portion 17 is disconnected from the lifting cam 18, the sheet feed roller 5 is moved downward under its own weight or by a spring (not illustrated).

The movable wall 6, serving as the movable regulating portion, is disposed on the downstream side of the sheet stacking portion 3 in the sheet feeding direction (on the left of FIG. 1). The movable wall 6 is pivotable about a pivot shaft 6a provided under the movable wall 6 and is biased by a spring (not illustrated) so as to be tiltable such that upper part of the wall in a substantially vertical posture falls forward. When the movable wall 6 is in substantially the vertical posture, a regulation surface 6b, serving as the inner surface, or rear surface of the movable wall 6, configured to regulate the leading edges of the sheets is at a substantially right angle (about 90 degrees) relative to a flat surface (horizontal plane) of the sheet stacking portion 3 on which the sheets are supported. In the present embodiment, the sheet support surface of the sheet stacking portion 3 is the horizontal plane. The sheet support surface may be slightly inclined. In this case, the regulation surface 6b of the movable wall 6 is set at a substantially right angle (about 90 degrees) or angle slightly smaller than it relative to the sheet support surface of the sheet stacking portion 3.

The outer surface, or front surface of the movable wall 6 is in sliding contact with the tilting cam 7. When the periphery, indicated at 7a, of the tilting cam 7 is in sliding contact with the movable wall 6, the movable wall 6 is in substantially the vertical posture. Referring to FIG. 2C, when the tilting cam 7 is rotated and a recess 7b faces the movable wall 6, the movable wall 6 is tilted forward. In the following description, the position of the movable wall 6 in substantially the vertical posture for regulating the leading edges of the sheets will be called a "regulation position" and the position of the movable wall 6 in a forward tilted posture will be called a "regulation release position".

The tilting cam 7 is fixed to the regulating-portion drive gear 16. The driving force is transferred from the motor (not illustrated), serving as the driving source, through the drive gear train G, the holding-portion drive gear 19, and the intermediate gear MG to the regulating-portion drive gear 16, so that the tilting cam 7 is rotated to pivot the movable wall 6. The movable wall 6 includes ribs 6c, configured to reduce sliding resistance with a sheet, arranged on the upper end thereof.

An operation of separating and feeding sheets by the sheet feeding device 1 according to the first embodiment will now be described with reference to FIGS. 3 and 4A to 4C.

Figure 3:
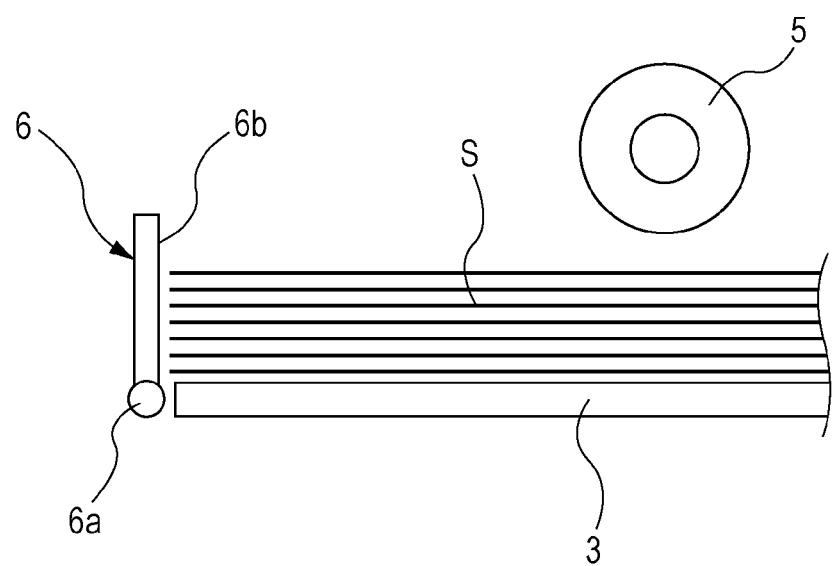
FIG. 3 is a schematic diagram of essential part of the sheet feeding device of FIG. 1.

FIG. 3 is a schematic sectional view of the sheet stacking portion 3 on which the bundle of sheets S is set by a user. In such a state, the sheet feed roller 5 is located in a receding position at a higher level and the movable wall 6 is located in the regulation position such that the movable wall 6 is in substantially the vertical posture to regulate the movement of the sheets in the sheet feeding direction. Accordingly, when the user sets the bundle of sheets S such that the leading edges of the sheets S abut against the regulation surface 6b, serving as the inner surface, of the movable wall 6 in substantially the vertical posture (where the wall is perpendicular to the sheet support surface of the sheet stacking portion 3), the sheet bundle can be set with reliably. Specifically, when the user inserts the sheet bundle onto the sheet support surface of the sheet stacking portion 3 until the leading edges of the sheets abut against the regulation surface 6b of the movable wall 6, the user can get a sense of setting the sheet bundle. Note that a trailing-edge regulating portion configured to regulate the trailing edge of the sheet bundle is not indispensable. If a trailing-edge regulating plate is not used, the user can easily set a sheet bundle with one hand. Accordingly, ease of use (ease of setup of sheets) can be achieved.

Figure 4A:
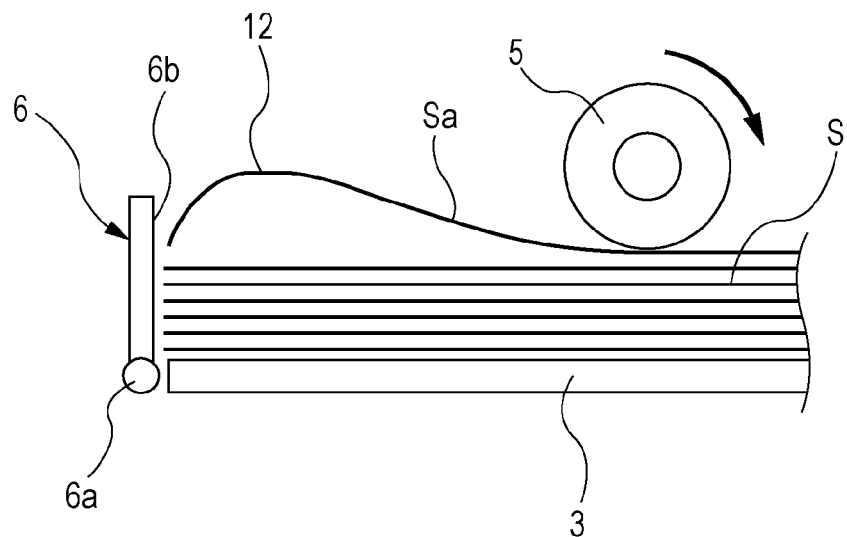
FIG. 4A is a diagram illustrating a sheet feeding operation of the sheet feeding device of FIG. 1.

FIG. 4A is a diagram illustrating a state where a sheet feeding operation starts after setup of the sheet bundle (the driving transfer mechanism is shifted from a mode of FIG. 2A to that of FIG. 2B). The sheet feed roller 5, which has receded at a higher level, is swung and is brought into contact with the uppermost sheet Sa of the stacked sheets S and is then rotated. Thus, the uppermost sheet Sa is fed but the leading edge of the uppermost sheet Sa is regulated by the movable wall 6 disposed in the regulation position, so that a loop 12 is formed in the uppermost sheet Sa between the sheet feed roller 5 and the movable wall 6. To form the loop 12, the coefficient of friction between the sheet feed roller 5 and the sheet S is set such that a feeding force applied by the sheet feed roller 5 is higher than a buckling force (stiffness that maintains the flatness) of the sheet S. On the other hand, the second and subsequent sheets S start to be fed to the downstream side by a frictional force between the sheets but a loop is not formed in the second and subsequent sheets S because the frictional force is set so as to be lower than the buckling force of the sheet.

Figure 4B:
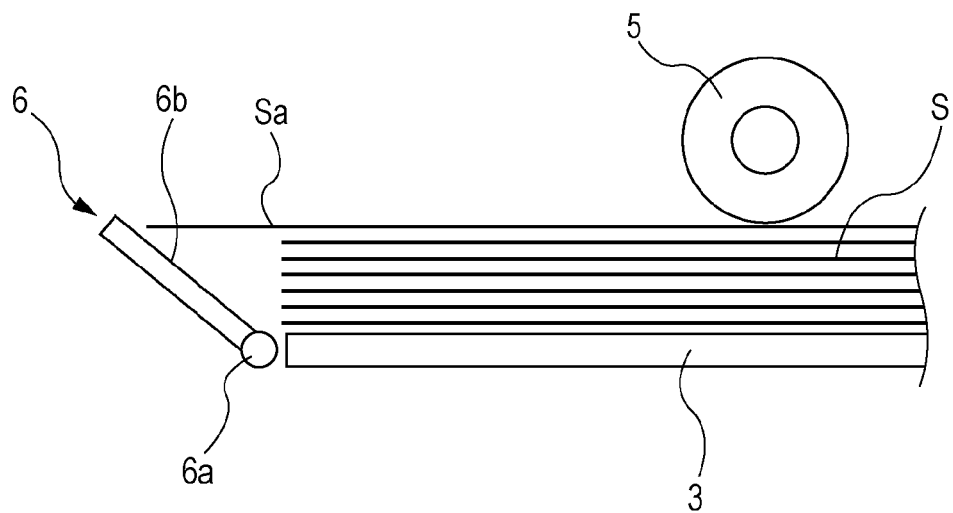
FIG. 4B is a diagram illustrating the sheet feeding operation of the sheet feeding device of FIG. 1.

FIG. 4B is a diagram illustrating the sheet feeding operation after formation of the loop in the uppermost sheet Sa. After formation of the loop in the uppermost sheet Sa, the rotation of the sheet feed roller 5 is temporarily stopped to finish the formation of the loop. Since the position of the notch 19a of the holding-portion drive gear 19 is set such that the notch 19a faces the drive gear train G in the state of FIG. 2B, the driving force is not transferred to the sheet feed roller 5, so that the rotation of the sheet feed roller 5 is temporarily stopped.

After that, the movable wall 6 is pivoted about the pivot shaft 6a from the regulation position to the regulation release position. When the movable wall 6 is shifted to the regulation release position, the loop formed in the uppermost sheet Sa is removed, so that the leading edge of the uppermost sheet Sa projects on the downstream side beyond the leading edges of the second and subsequent sheets by a distance corresponding to the formed loop. Temporarily stopping the rotation of the sheet feed roller 5 reliably prevents the second and subsequent sheets from being brought out when the movable wall 6 is tilted.

It is unnecessary to temporarily stop the sheet feed roller 5. In this case, so long as a loop is sufficiently formed in the uppermost sheet, if the second and subsequent sheets are slightly brought out when the movable wall 6 is tilted, the leading edge of the uppermost sheet in which the loop is removed can be allowed to considerably project beyond the leading edges of the second and subsequent sheets. Accordingly, the uppermost sheet can be reliably separated from the second and subsequent sheets. If the sheet feed roller 5 is not temporarily stopped as described above, the time to stop the roller is not needed, thus increasing the number of sheets conveyed per unit time, namely, throughput.

Figure 4C:
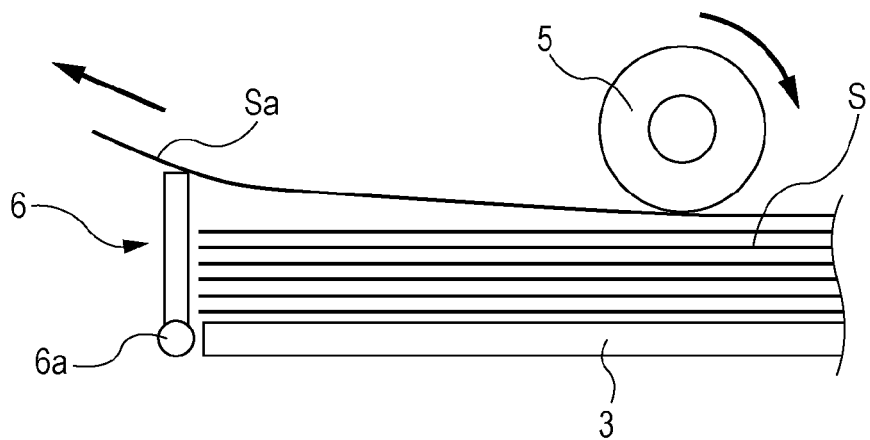
FIG. 4C is a diagram illustrating the sheet feeding operation of the sheet feeding device of FIG. 1.

FIG. 4C is a diagram illustrating the sheet feeding operation after removal of the loop in the uppermost sheet Sa. After the loop in the uppermost sheet Sa is removed, the movable wall 6 in the regulation release position is returned to the regulation position. At this time, the leading edge of the uppermost sheet Sa projects on the downstream side beyond the leading edges of the second and subsequent sheets because the loop is removed. Accordingly, the leading edge of the uppermost sheet Sa is brought into contact with the regulation surface 6b of the movable wall 6 which is being shifted to the regulation position and is then moved upward along the regulation surface 6b, so that the leading end of the uppermost sheet Sa is moved over the edge of the movable wall 6. When the movable wall 6 is returned to the regulation position where the wall is in substantially the vertical posture, the leading end of the uppermost sheet Sa is lying over the edge of the movable wall 6 and the leading edges of the second and subsequent sheets are regulated by the regulation surface 6b of the movable wall 6.

Consequently, the leading end of the uppermost sheet Sa is spaced apart from the second sheet. When the movable wall 6 is returned to the regulation position, the uppermost sheet Sa has to be moved over the edge of the movable wall 6. Therefore, an angle (acute angle) formed by the regulation surface 6b and the leading edge of the uppermost sheet Sa brought into contact with the movable wall 6 which is being shifted to the regulation position has to be 60 degrees or less.

After that, the temporarily stopped sheet feed roller 5 starts rotating, such that only the uppermost sheet Sa can be fed from above the movable wall 6 to the downstream side. The movable wall 6 regulates and prevents the second and subsequent sheets from being brought out, thus preventing multiple-sheet feeding. The lifting cam 18 and the tilting cam 7 rotated by the motor (not illustrated) allow lifting of the holding portion 17 and pivoting of the movable wall 6 at proper timing, thus achieving the above-described series of operation steps.

The sheet feeding device 1 according to the first embodiment does not need a high-cost component, such as a related-art intermediate plate unit or a frictional separating member. Essential part of the device is composed of the sheet feed roller 5 and the movable wall 6. Advantageously, a reduction in cost and size (space) of the device can be achieved. Furthermore, the sound of lifting an intermediate plate and the sound of sliding a sheet fed between the sheet feed roller and the frictional member which occur in a frictional separation sheet feeding device do not occur in the device according to the present embodiment. Accordingly, silence is also achieved. Moreover, since sheets can be set so as to abut against the movable wall 6 in substantially the vertical posture relative to the sheet support surface of the sheet stacking portion 3, the ease of setup of sheets can be achieved.

Second Embodiment

Figure 5A:
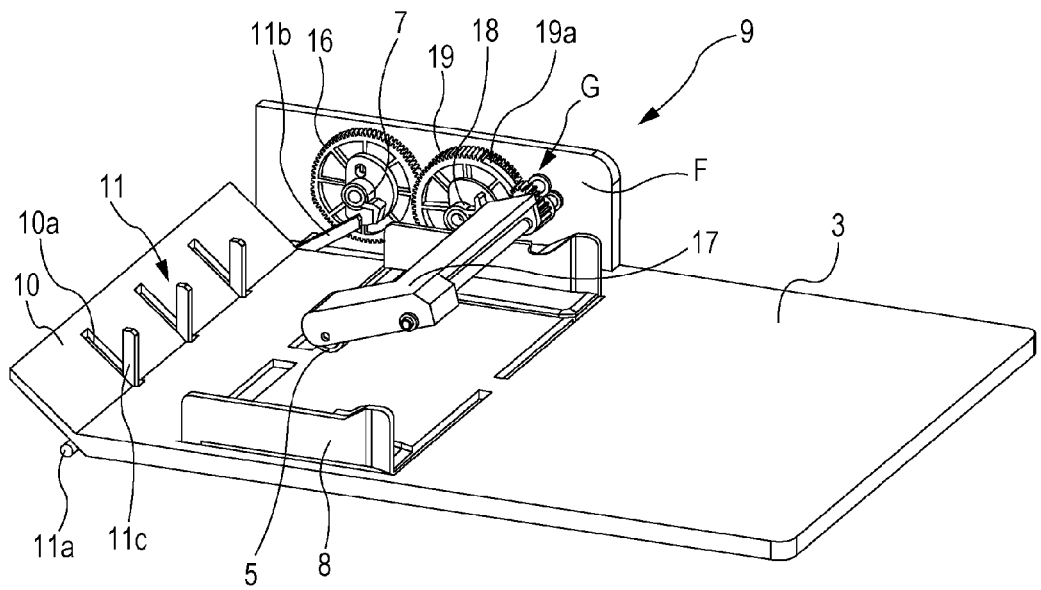
FIG. 5A is a perspective view of a sheet feeding device according to a second embodiment.
Figure 5B:
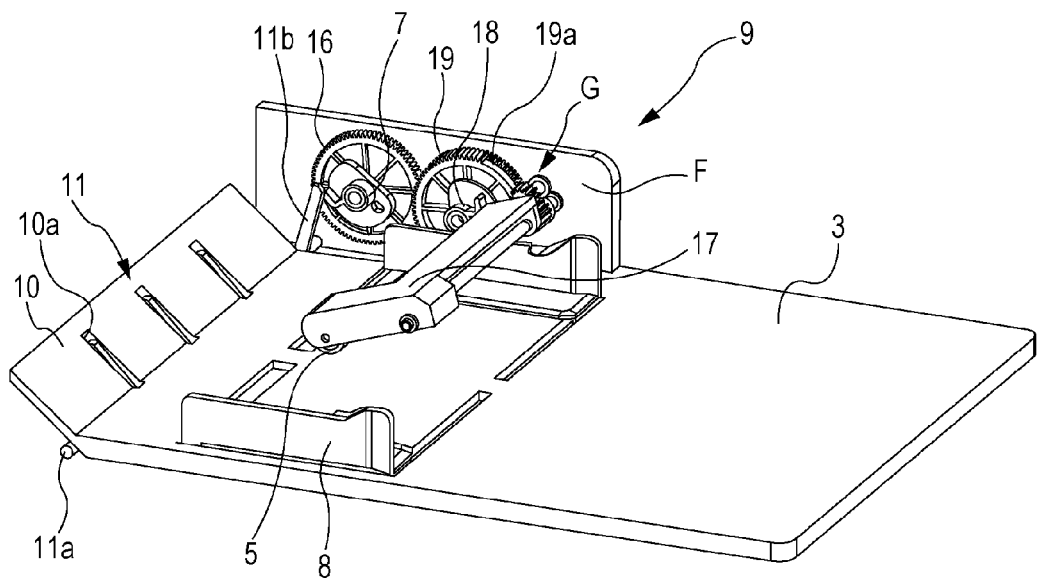
FIG. 5B is a perspective view of the sheet feeding device according to the second embodiment.

FIGS. 5A and 5B are perspective views of a sheet feeding device 9 according to a second embodiment. The second embodiment differs from the first embodiment in that the movable regulating portion, constituting a feature of the present invention, includes a fixed slope member 10 and a movable regulation rib member 11 instead of the plate-shaped movable wall 6 illustrated in FIG. 1. In addition, in the present embodiment, the intermediate gear MG to be placed between the holding-portion drive gear 19 and the regulating-portion drive gear 16 of the driving transfer mechanism is omitted as illustrated in FIG. 5A. The driving force from the motor (not illustrated) is directly supplied to the shaft of the regulating-portion drive gear 16. For the rest, the second embodiment is substantially the same as the first embodiment. Accordingly, the same or similar components as or to those in the first embodiment are designated by the same reference numerals and redundant description is omitted.

Referring to FIG. 5A, the regulation rib member 11 includes a pivot shaft 11a and a plurality of columnar ribs integrated with the pivot shaft 11a. It is unnecessary to provide a plurality of columnar ribs. The regulation rib member 11 may include a single columnar rib. The fixed slope member 10 is disposed downstream of the sheet stacking portion 3 and is tilted such that its height is gradually increased from the upstream side to the downstream side in the sheet feeding direction.

The regulation rib member 11 is pivoted about the pivot shaft 11a between two positions, i.e., a regulation position where the regulation rib member 11 is in substantially the vertical posture and a regulation release position where the regulation rib member 11 is positioned below the fixed slope member 10. The fixed slope member 10 fixed to the main body of the apparatus is disposed in a place where the regulation rib member 11 is disposed. The fixed slope member 10 has notches 10a which allow the regulation ribs of the regulation rib member 11 to pass through.

The pivot shaft 11a of the regulation rib member 11 is provided with a cam follower 11b. The cam follower 11b is in sliding contact with the tilting cam 7 fixed to the regulating-portion drive gear 16. With this arrangement, when the regulating-portion drive gear 16 is rotated, the regulation rib member 11 is pivoted through the cam follower 11b in sliding contact with the tilting cam 7.

FIG. 5A illustrates a state where the ribs of the regulation rib member 11 are stopped in the regulation position such that the ribs are in substantially the vertical posture. FIG. 5B illustrates a state where the regulation rib member 11 has fallen forward and is located in the regulation release position. While the regulation rib member 11 is in the regulation release position, the ribs do not project upwardly from the upper surface of the fixed slope member 10. The ribs are retracted from the upper surface of the fixed slope member 10 into the notches 10a.

A sheet feeding operation of the sheet feeding device 9 according to the second embodiment will be described with reference to FIGS. 6 and 7A to 7C.

Figure 6:
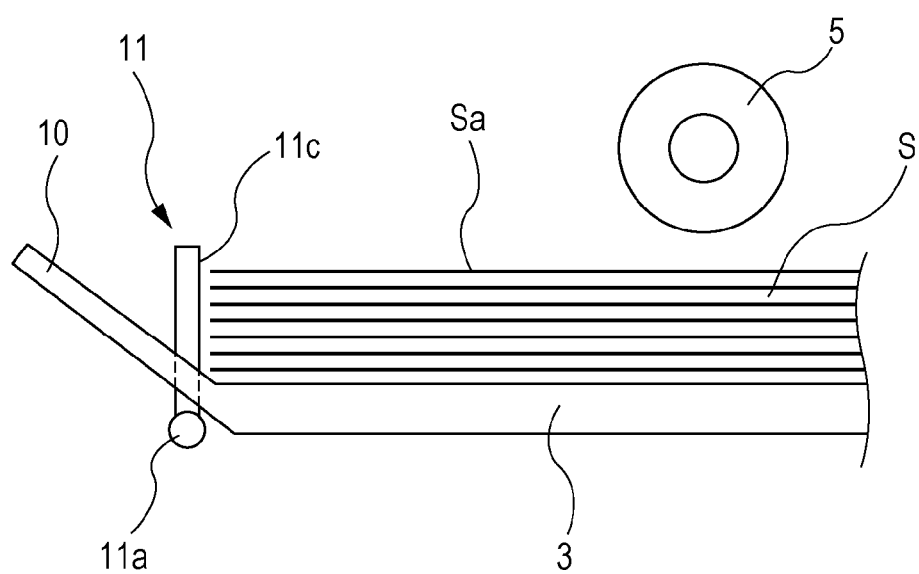
FIG. 6 is a schematic diagram of essential part of the sheet feeding device of FIGS. 5A and 5B.

FIG. 6 is a schematic diagram illustrating a state where a bundle of sheets S is set on the sheet stacking portion 3 by the user. In this state, the sheet feed roller 5 is located in the receding position at a higher level and the ribs of the regulation rib member 11 are arranged in the regulation position for regulating the movement of the sheets in the sheet feeding direction. Accordingly, when the user sets the bundle of sheets S such that the leading edges of the sheets S abut against regulation surfaces 11c of the respective ribs in substantially the vertical posture (substantially perpendicular to the sheet support surface of the sheet stacking portion 3), the sheet bundle can be set with reliability. In other words, when the user inserts the sheet bundle until the leading edges of the sheets abut against the regulation surfaces 11c of the ribs of the regulation rib member 11, the user can get a sense of setting the sheet bundle.

Figure 7A:
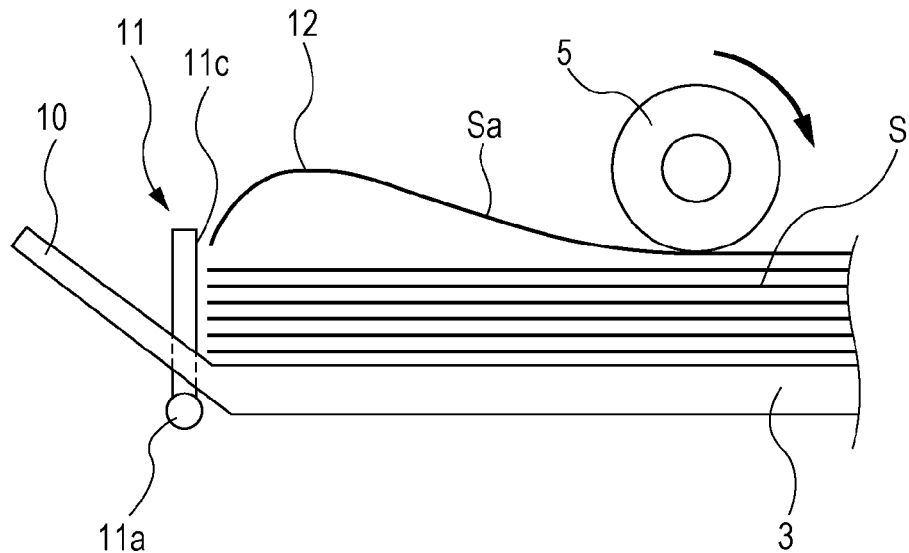
FIG. 7A is a diagram illustrating a sheet feeding operation of the sheet feeding device of FIGS. 5A and 5B.

FIG. 7A is a diagram illustrating a state where a sheet feeding operation starts after setup of the sheets. The sheet feed roller 5, which has receded in the receding position at a higher level, is moved downward and is brought into contact with the upper surface of the uppermost sheet Sa of the stacked sheets S and is then rotated. Consequently, the uppermost sheet Sa is fed but the leading edge of the sheet is regulated by the regulation surfaces 11c of the respective ribs of the regulation rib member 11 in substantially the vertical posture, thus forming a loop 12 in the uppermost sheet Sa between the sheet feed roller 5 and the regulation rib member 11. To form the loop 12, the coefficient of friction between the sheet feed roller 5 and the sheet S is set such that a feeding force applied by the sheet feed roller 5 is higher than the buckling force (stiffness that maintains the flatness) of the sheet. On the other hand, the second and subsequent sheets S start to be fed to the downstream side by a frictional force between the sheets but a loop is not formed in the second and subsequent sheets because the frictional force is set so as to be lower than the buckling force of the sheet.

Figure 7B:
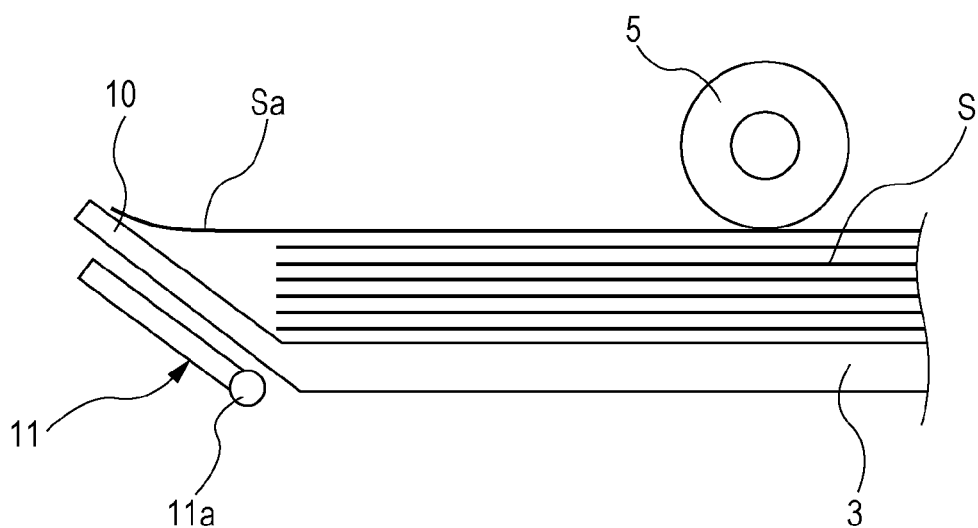
FIG. 7B is a diagram illustrating the sheet feeding operation of the sheet feeding device of FIGS. 5A and 5B.

FIG. 7B is a diagram illustrating the sheet feeding operation after formation of the loop in the uppermost sheet Sa. After the loop is formed in the uppermost sheet Sa, the rotation of the sheet feed roller 5 is temporarily stopped to finish the formation of the loop. Since the position of the notch 19*a* of the holding-portion drive gear 19 is set such that the notch 19*a* faces the drive gear train G in such a state, the driving force is not transferred to the sheet feed roller 5, so that the rotation of the sheet feed roller 5 is temporarily stopped.

After that, when the regulation rib member 11 is shifted from the regulation position to the regulation release position below the fixed slope member 10, the loop formed in the uppermost sheet Sa is removed. At this time, the leading edge of the uppermost sheet Sa projects on the downstream side beyond the leading edges of the second and subsequent sheets by a distance corresponding to the formed loop such that the leading end of the uppermost sheet Sa is lying over the fixed slope member 10.

Figure 7C:
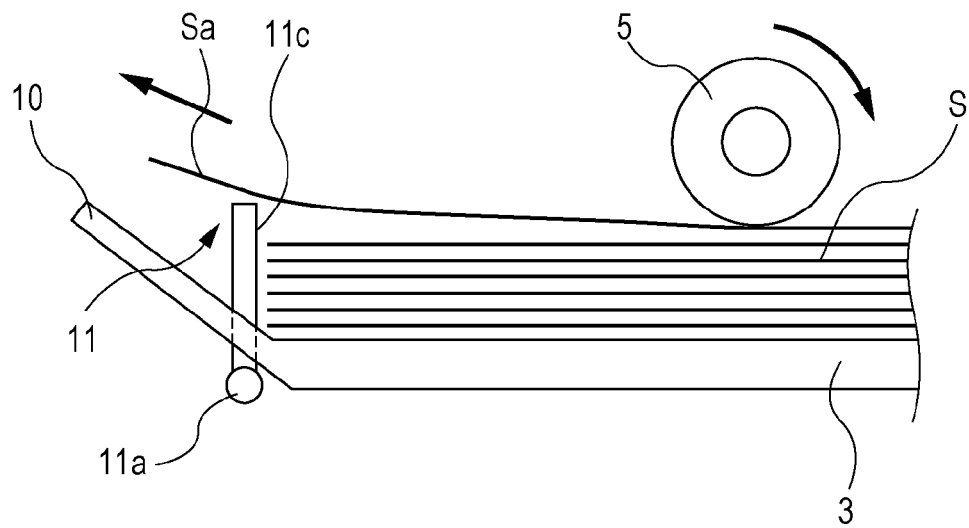
FIG. 7C is a diagram illustrating the sheet feeding operation of the sheet feeding device of FIGS. 5A and 5B.

FIG. 7C is a schematic diagram illustrating the sheet feeding operation after removal of the loop in the uppermost sheet. After the loop in the uppermost sheet is removed, the regulation rib member 11 in the regulation release position is returned to the regulation position. At this time, the leading edge of the uppermost sheet Sa projects on the downstream side beyond the leading edges of the second and subsequent sheets because the loop is removed. Accordingly, the leading end of the uppermost sheet Sa is lying on the fixed slope member 10. After that, the uppermost sheet Sa is brought into contact with the regulation surfaces 11*c* of the respective ribs of the regulation rib member 11, which is being returned from the regulation release position to the regulation position, and is then moved upward along the regulation surfaces 11*c*, so that the leading end of the uppermost sheet Sa is moved over the ribs. When the regulation rib member 11 is returned to the regulation position where the ribs are in substantially the vertical posture, the leading end of the uppermost sheet Sa is lying over the upper ends of the respective ribs of the regulation rib member 11 and the leading edges of the second and subsequent sheets are regulated by the regulation surfaces 11*c* of the ribs of the regulation rib member 11. Consequently, the leading end of the uppermost sheet Sa is separated apart from the second sheet.

After that, the rotation of the sheet feed roller 5, which has been temporarily stopped, is restarted, thus feeding only the uppermost sheet Sa lying over the regulation rib member 11 to a device on the downstream side. At this time, the regulation rib member 11 regulates and prevents the second and subsequent sheets from being brought out, thus preventing multiple-sheet feeding.

According to the present embodiment, the fixed slope member 10 is included in the main body of the apparatus integrated with the sheet stacking portion 3. The movable regulating portion can be achieved by small and simple parts. Advantageously, the cost of the sheet feeding device can be further reduced while offering the same advantages as those of the first embodiment.

Third Embodiment

Figure 8A:
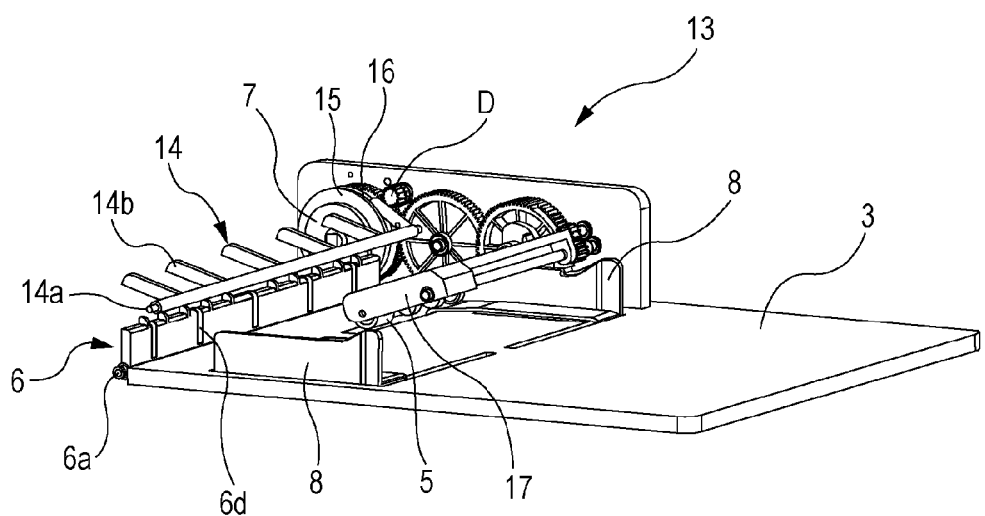
FIG. 8A is a perspective view of a sheet feeding device according to a third embodiment.

FIG. 8A is a perspective view of a sheet feeding device 13 according to a third embodiment. The third embodiment differs from the first embodiment in that a sheet edge pressing portion 14 is provided. For the rest, the third embodiment is substantially the same as the first embodiment. Accordingly, the same or similar components as or to the first embodiment are designated by the same reference numerals and redundant description is omitted.

The sheet edge pressing portion 14 includes a pivot shaft 14*a* and a plurality of sheet pressing members 14*b* extending from the pivot shaft 14*a* in a direction orthogonal to the axis of the shaft. The sheet edge pressing portion 14 is in sliding contact with a pressing cam 15 fixed to the regulating-portion drive gear 16. When the pressing cam 15 is rotated, the sheet edge pressing portion 14 is pivoted about the pivot shaft 14*a*, so that the sheet pressing members 14*b* are moved between a pressing position, where the members press the leading edge of a sheet obliquely downward, and a receding position where the members are not in contact with the sheet. The regulating-portion drive gear 16 is rotated by the driving force from the motor (not illustrated), so that the pressing cam 15 and the tilting cam 7 are also rotated, thus pivoting the sheet edge pressing portion 14 and the movable wall 6 at predetermined timing.

The movable wall 6 has slits 6*d* each of which extends downward from the upper end of the wall in a position where the slit faces the corresponding sheet pressing member 14*b* of the sheet edge pressing portion 14. When the movable wall 6 is placed in the regulation position, the sheet pressing members 14*b* are inserted into the respective slits and are positioned in the pressing position such that the members intersect the movable wall 6.

A sheet feeding operation of the sheet feeding device 13 according to the third embodiment will now be described with reference to FIGS. 8B and 9A to 9C.

Figure 8B:
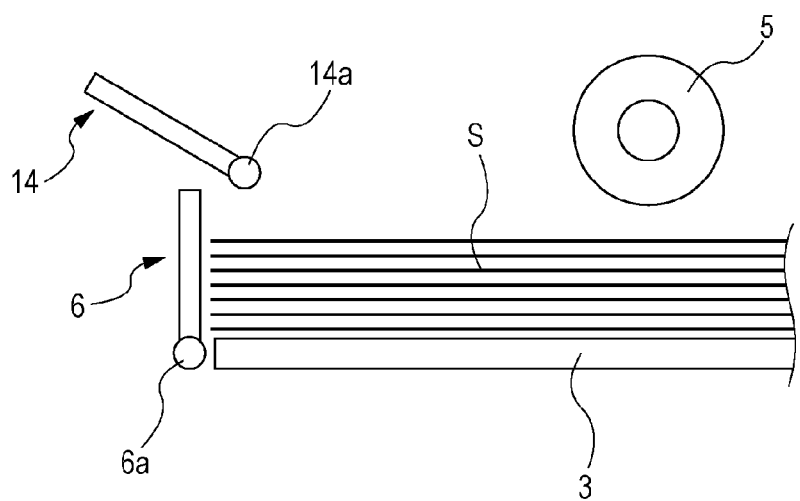
FIG. 8B is a schematic diagram of essential part of the sheet feeding device of FIG. 8A.

FIG. 8B is a diagram illustrating a state where a bundle of sheets S is set on the sheet stacking portion 3 by the user, the state being the same as that in FIG. 3 related to the first embodiment. At this time, the sheet edge pressing portion 14 is positioned at the receding position at a higher level.

Figure 9A:
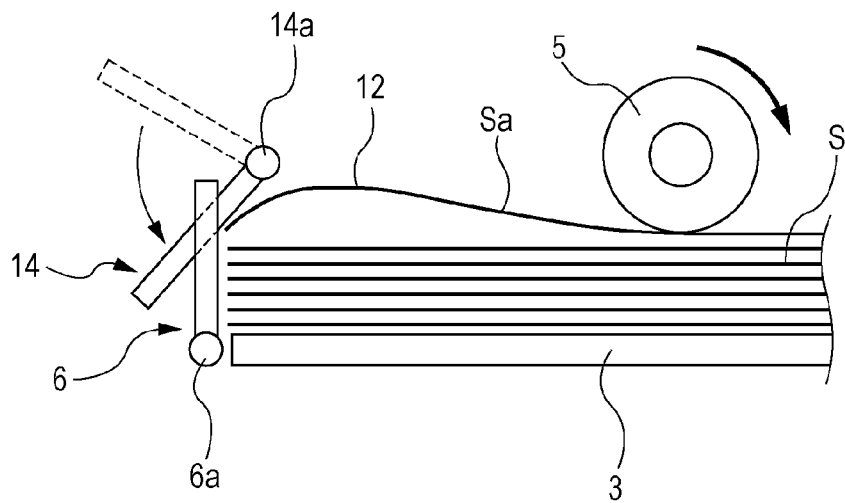
FIG. 9A is a diagram illustrating a sheet feeding operation of the sheet feeding device of FIG. 8A.

FIG. 9A is a diagram illustrating a state where the sheet feeding operation starts after setup of the bundle of sheets S. First, the sheet feed roller 5, which has receded at a higher level, is swung and is brought into contact with the uppermost sheet of the bundle of sheets stacked. Subsequently, the sheet edge pressing portion 14, which has receded at a higher level, is moved downward and presses the leading edge of the sheet. The sheet edge pressing portion 14 is urged by a resilient member (not illustrated) such that the portion 14 presses the leading edge of the sheet obliquely downward. When the sheet edge pressing portion 14 presses the leading edge of the sheet, the sheet is not moved in the direction opposite to the sheet feeding direction because the sheet feed roller 5, which has first been moved downward, is in pressure contact with the sheet. After that, the rotation of the sheet feed roller 5 is started and the uppermost sheet Sa starts to be fed but the leading edge of the sheet is regulated by the movable wall 6 in the regulation position where the wall is in substantially the vertical posture. Since the sheet feeding force applied by the sheet feed roller 5 is higher than the buckling force of the sheet, a loop 12 is formed in the vicinity of the leading edge of the uppermost sheet Sa. At this time, since the sheet pressing members 14*b* apply an oblique downward force to the leading edge of the uppermost sheet Sa, the loop 12 which is upturned is surely formed. A loop in the opposite direction, namely, a downturned loop is not formed.

Figure 9B:
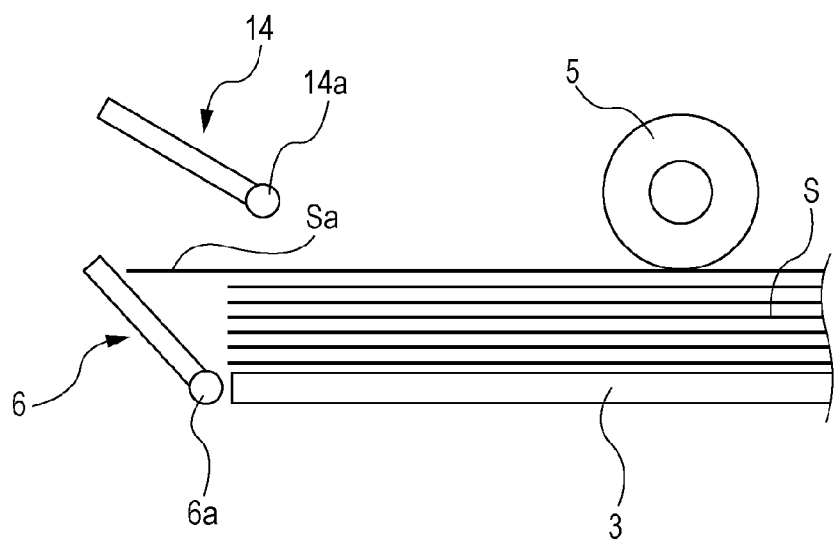
FIG. 9B is a diagram illustrating the sheet feeding operation of the sheet feeding device of FIG. 8A.

FIG. 9B is a diagram illustrating the sheet feeding operation after formation of the loop in the uppermost sheet Sa. After the loop is formed in the uppermost sheet, the rotation of the sheet feed roller 5 is temporarily stopped to finish the formation of the loop. After that, the sheet edge pressing portion 14 is pivoted about the pivot shaft 14*a* to the receding position at a higher level and the movable wall 6 is also pivoted from the regulation position to the regulation release position. When the sheet pressing members 14*b* and the movable wall 6 recede, the loop formed in the uppermost sheet Sa is removed, so that the leading edge of the uppermost sheet Sa projects on the downstream side beyond the leading edges of the second and subsequent sheets by a distance corresponding to the formed loop.

Figure 9C:
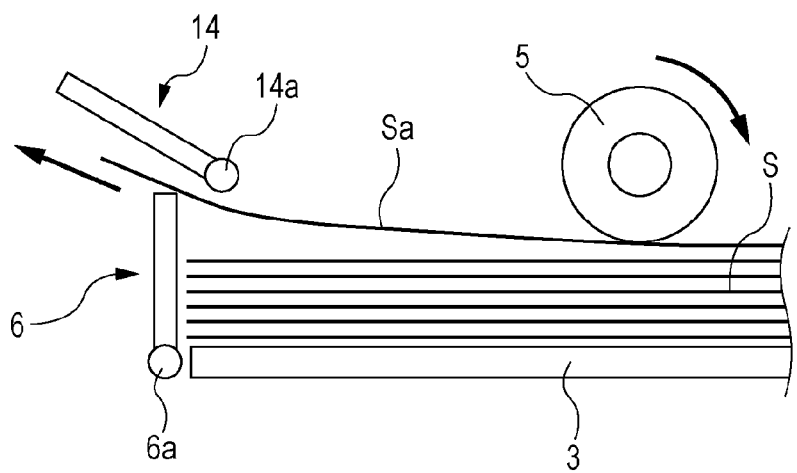
FIG. 9C is a diagram illustrating the sheet feeding operation of the sheet feeding device of FIG. 8A.

FIG. 9C is a diagram illustrating the sheet feeding operation after removal of the loop in the uppermost sheet Sa. After the loop in the uppermost sheet Sa is removed, the movable wall 6 in the regulation release position is again moved to the regulation position. At this time, since the leading edge of the uppermost sheet Sa projects on the downstream side beyond the leading edges of the second and subsequent sheets because the loop is removed, the leading end of the uppermost sheet Sa is moved onto the movable wall 6 which is being returned to the regulation position. When the movable wall 6 is returned to the regulation position where the wall is in substantially the vertical posture, the leading end of the uppermost sheet Sa is lying over the movable wall 6. Since the movable wall 6 regulates the leading edges of the second and subsequent sheets, the leading end of the uppermost sheet Sa is separated apart from the second and subsequent sheets. After that, the rotation of the sheet feed roller 5, which has been temporarily stopped, is restarted, thus feeding only the uppermost sheet Sa lying over the movable wall 6 to the downstream side.

According to the third embodiment, if sheets set by the user have curl, an upturned loop can be stably formed in the vicinity of the leading edge of the sheet. Advantageously, the performance of more reliable separation can be provided without being affected by the curl of sheets while offering the same advantages as those of the first embodiment.

Fourth Embodiment

Figure 10A:
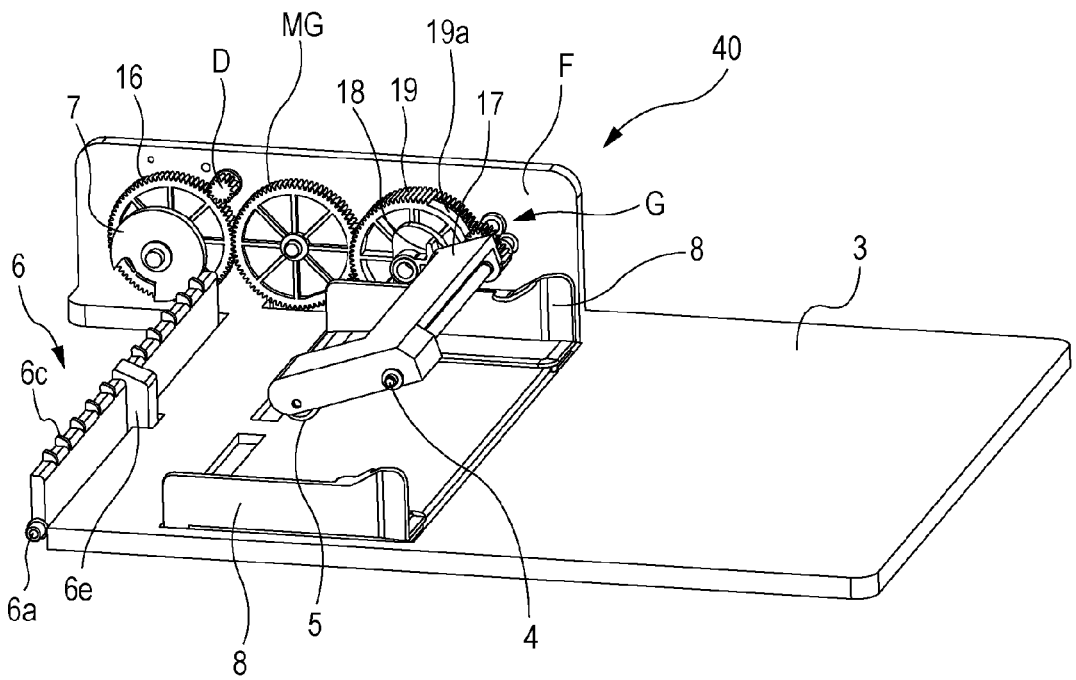
FIG. 10A is a perspective view of a sheet feeding device according to a fourth embodiment.
Figure 10B:
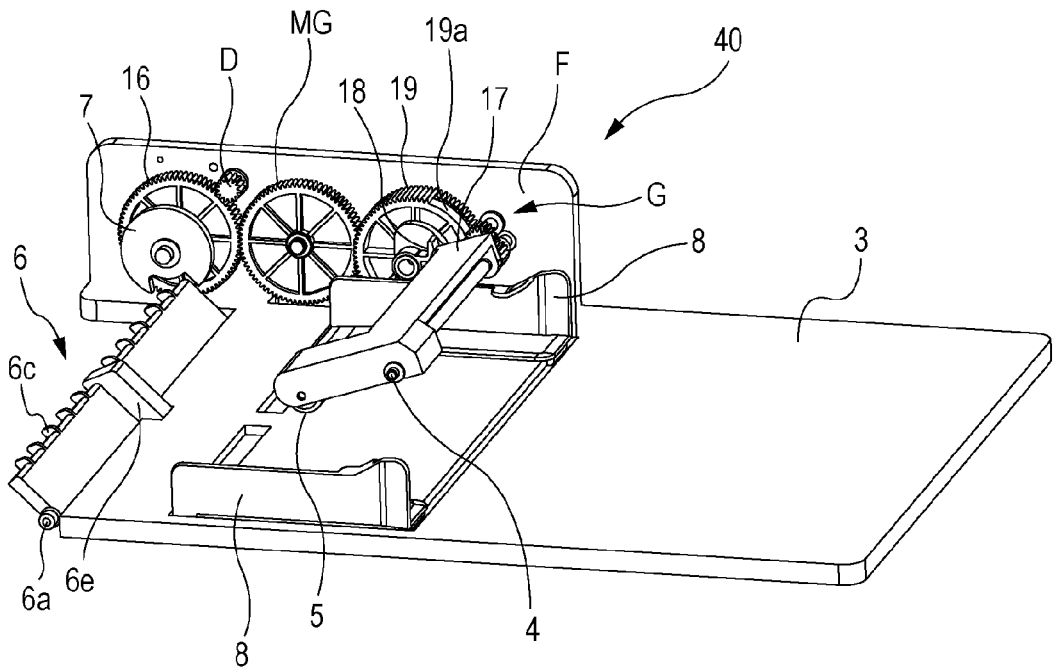
FIG. 10B is a perspective view of the sheet feeding device according to the fourth embodiment.

FIGS. 10A and 10B are perspective views of a sheet feeding device 40 according to a fourth embodiment. The fourth embodiment differs from the first embodiment in that the movable wall 6 integrally includes a rib-shaped protrusion 6*e* at the middle of thereof. For the rest, the fourth embodiment is substantially the same as the first embodiment. Accordingly, the same or similar components as or to those of the first embodiment are designated by the same reference numerals and redundant description is omitted.

Referring to FIGS. 10A and 10B, the protrusion 6*e* which protrudes from the regulation surface 6*b* toward sheets stacked on the sheet stacking portion 3 is integrated with a middle portion of the movable wall 6 in the longitudinal direction thereof. A facing end surface of the protrusion 6*e* which faces the sheets functions as a regulation surface to substantially regulate the sheets.

Figure 11A:
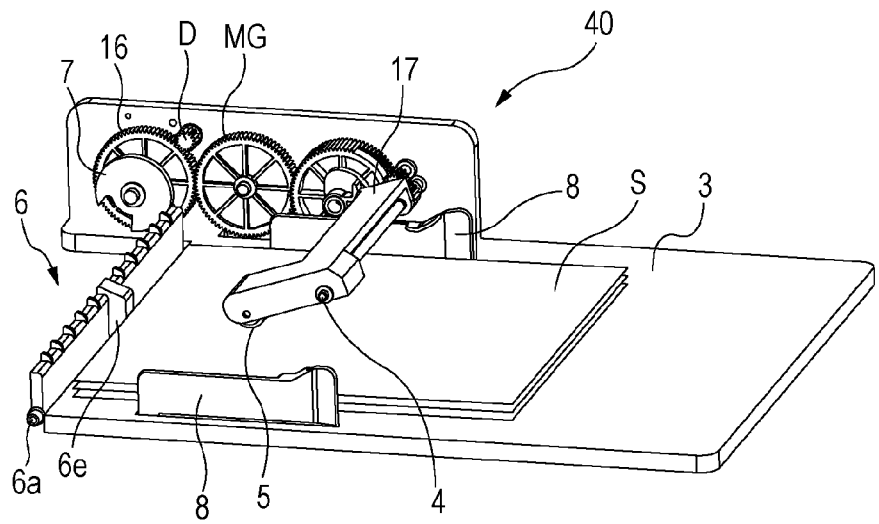
FIG. 11A is a diagram illustrating a sheet feeding operation of the sheet feeding device of FIGS. 10A and 10B.
Figure 11B:
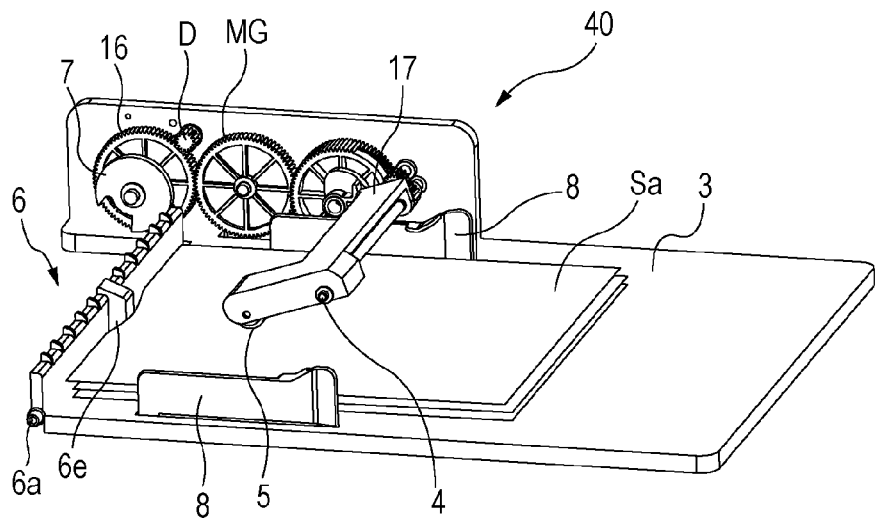
FIG. 11B is a diagram illustrating the sheet feeding operation of the sheet feeding device of FIGS. 10A and 10B.
Figure 11C:
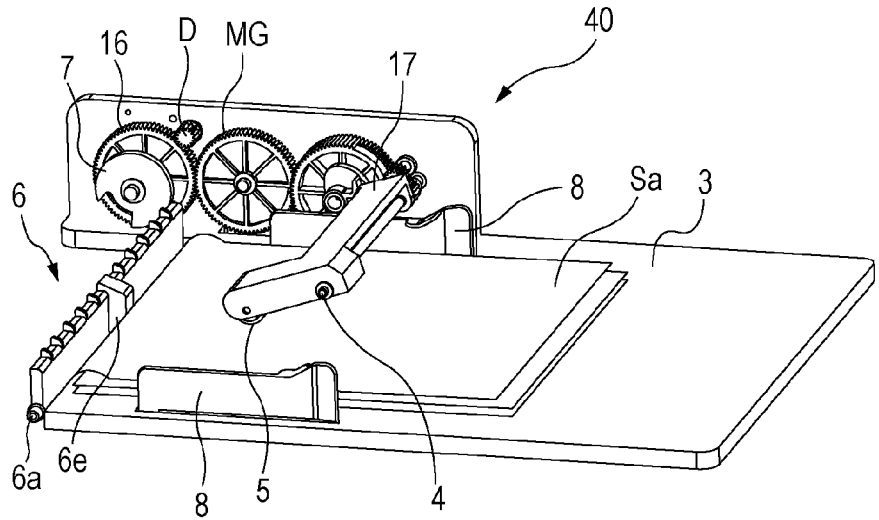
FIG. 11C is a diagram illustrating the sheet feeding operation of the sheet feeding device of FIGS. 10A and 10B.

An operation of the protrusion 6*e* will now be described with reference to FIGS. 11A to 11C. FIG. 11A is a diagram illustrating a state where a bundle of sheets S is set. This state is the same as that illustrated in FIG. 3 related to the first embodiment. When the bundle of sheets S is set in this state, middle portions of the leading edges of the sheets S abut against the facing end surface of the protrusion 6*e*. At this time, the leading edges of the sheets S are not in contact with any part other than the facing end surface of the protrusion 6*e*.

When the sheet feeding operation starts, the uppermost sheet Sa is fed by the sheet feed roller 5. Referring to FIG. 11B, a loop is gradually formed in the middle portion of the leading edge of the uppermost sheet Sa which abuts against the protrusion 6*e*. When the uppermost sheet Sa is further fed by the sheet feed roller 5, the loop formed in the middle portion of the leading edge of the uppermost sheet Sa spreads to the whole width of the sheet as illustrated in FIG. 11C. The sheet feeding operation after formation of the loop is the same as that in the first embodiment. Accordingly, description is omitted.

According to the fourth embodiment, pressure applied to the leading edge of a sheet can be locally increased by reducing the area of contact between the movable wall 6 and the leading edge of the sheet. If a thick sheet of high stiffness is used, a loop can be stably formed with a small conveying force. Advantageously, the sheet can be separated and fed with reliability.

Figure 12A:
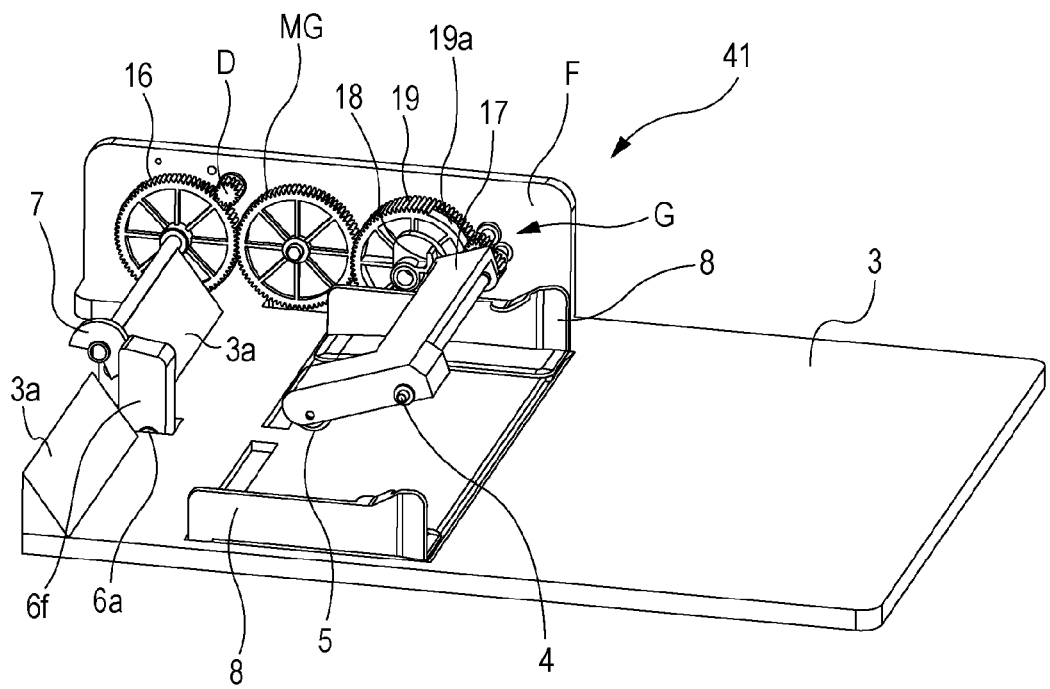
FIG. 12A is a perspective view of a sheet feeding device according to a modification of the fourth embodiment.
Figure 12B:
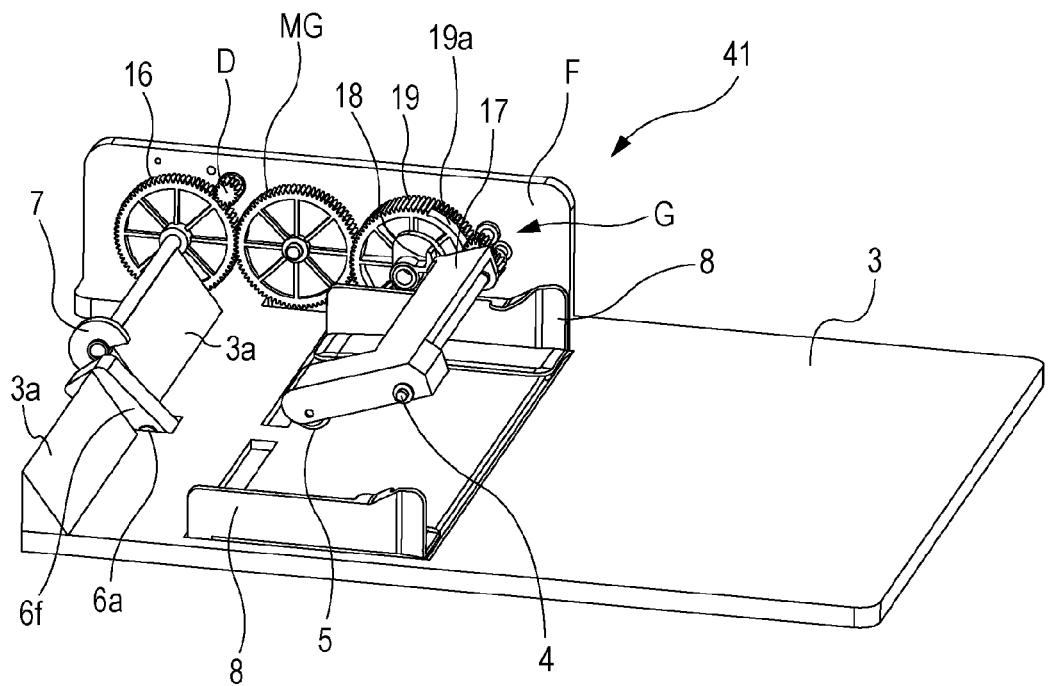
FIG. 12B is a perspective view of the sheet feeding device according to the modification of the fourth embodiment.

FIGS. 12A and 12B illustrate a sheet feeding device 41 according to a modification of the fourth embodiment. The device 41 includes a movable wall 6*f* that offers the same advantages as those of the above-described fourth embodiment. The movable wall 6*f* is a modification of the rib-shaped projection 6*e* in FIGS. 10A and 10B. The movable wall 6*f* is placed between fixed slope members 3*a* integrated with the sheet stacking portion 3. The movable wall 6*f* is tilted by the tilting cam 7 disposed in the vicinity of the movable wall 6*f*.

FIG. 12A illustrates the posture of the movable wall 6*f* when a bundle of sheets is set. FIG. 12B illustrates the movable wall 6*f* fell down when a sheet is fed.

Since a sheet feeding operation of the sheet feeding device 41 illustrated in FIGS. 12A and 12B is the same as that of the sheet feeding device 40 in FIG. 11, description is omitted.

Figure 14:
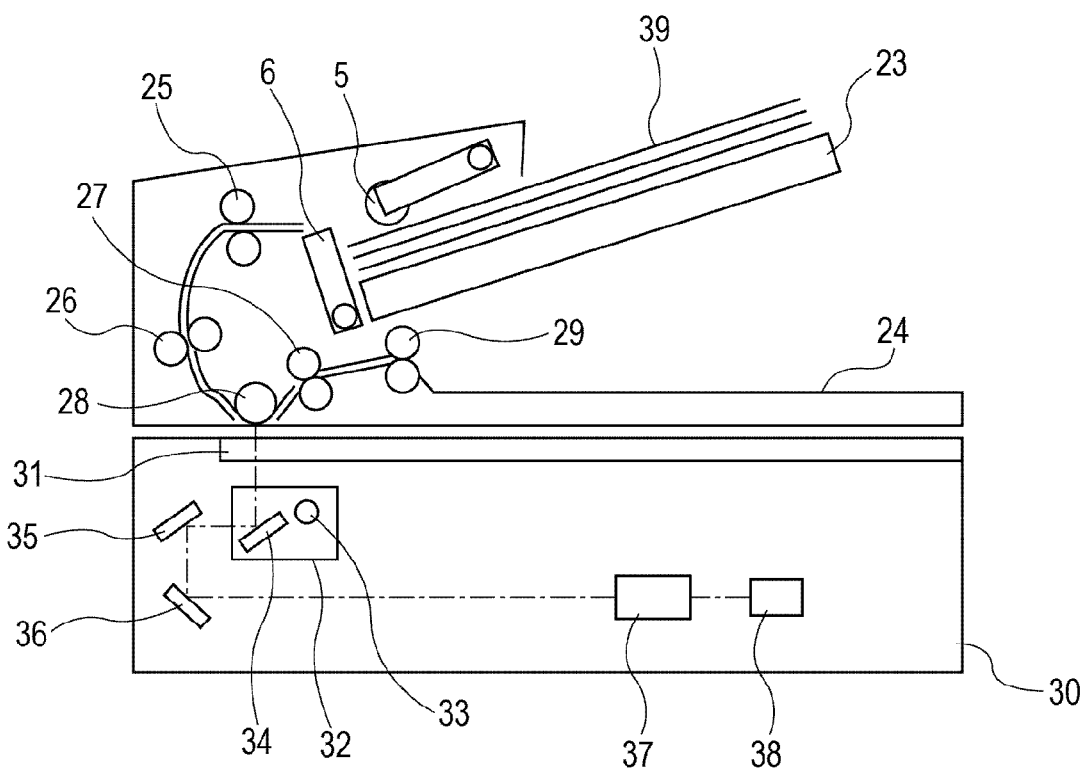
FIG. 14 is a schematic diagram of an image scanning apparatus according to another aspect of the present invention.

According to the above-described embodiments, the sheet feeding device provided for the image forming apparatus has been described as an example. The present invention is also applicable to an automatic document feeder of a general image scanning apparatus, as illustrated in FIG. 14.

The configuration of the image scanning apparatus will be described with reference to FIG. 14. The sheet feed roller 5 is disposed above a document tray 23 and the movable wall 6 is disposed downstream of the document tray 23. Documents 39 set on the document tray 23 are separated and fed one by one by the sheet feeding device according to the present invention and is then conveyed to a registration roller 25. The sheet feeding device has a configuration according to any of the first to third embodiments of the present invention.

After skew correction by the registration roller 25, a document is conveyed through a read roller 26 to a platen roller 28 and a platen glass 31. The document, passed through the platen roller 28, travels through a read discharge roller 27 and is then discharged onto a sheet output tray 24 through a discharge roller 29. An image scanning portion 30 includes a lamp 33 which irradiates a surface of the document with light, a lens 37, a CCD 38, and mirrors 34, 35, and 36 which guide light reflected from the document irradiated with light by the lamp 33 to the lens 37 and the CCD 38. The lamp 33 and the mirror 34 are attached to a scanning unit 32, which is controlled so as to move in parallel to the platen glass 31. The reflected light from the document is focused on the CCD 38 to be converted into an electrical image signal and the signal is output, so that document information can be read.

When the present invention is applied to the automatic document feeder as described above, documents can be separated and fed one by one with reliability. Moreover, since related-art frictional separation is not used, damage to documents is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A sheet feeding device comprising:
a sheet supporting portion configured to support a sheet;
a sheet feeding portion configured to feed an uppermost sheet of sheets supported by the sheet supporting portion;
a movable regulating portion disposed downstream of the sheets supported by the sheet supporting portion in a sheet feeding direction such that the movable regulating portion is configured to be positioned a regulation position, where the movable regulating portion regulates movement of the sheets in the sheet feeding direction, moved to fall forward from the regulation position to release regulation of the sheets, and then positioned at a regulation release position, where the movable regulating portion does not regulate the movement of the sheets in the sheet feeding direction; and
a movement mechanism configured to move the movable regulating portion between the movable regulating portion and the regulation release position, wherein, while the movable regulating portion regulates the movement of the sheets in the regulation position, the sheet feeding portion is operated to form a loop in the uppermost sheet between the sheet feeding portion and the movable regulating portion and, after the loop has been formed, the movable regulating portion is moved to fall toward a paper feeding-direction downstream side to remove the loop formed in the uppermost sheet and, after removal of the loop, the movable regulating portion is returned from the regulation release position towards the regulation position such that the movable regulating portion raises a leading end of the uppermost sheet to separate the uppermost sheet from other sheets,
wherein the movement mechanism comprises a cam for moving the movable regulation portion between the regulation position and the regulation release position by being rotated with driving power from a driving source.

2. The sheet feeding device according to claim 1, further comprising a sheet edge pressing portion disposed downstream of the sheets supported by the sheet supporting portion in the sheet feeding direction such that the sheet edge pressing portion is movable between a pressing position, where the sheet edge pressing portion downwardly presses the leading edge of the uppermost sheet, and a pressing release position, where the sheet edge pressing portion recedes upward to release the pressing of the uppermost sheet, wherein the sheet edge pressing portion is disposed such that the sheet edge pressing portion in the pressing position intersects the movable regulating portion.

3. The sheet feeding device according to claim 1, further comprising a driving transfer mechanism configured to transfer a driving force from a driving source to the sheet feeding portion, wherein the movable regulating portion is tilted by a tilting cam fixed to a regulating-portion drive gear provided for the driving transfer mechanism.

4. The sheet feeding device according to claim 1, wherein the movable regulating portion is column-shaped, and wherein a fixed slope member is provided for the sheet supporting portion such that the fixed slope member is disposed downstream of the sheet supporting portion in the sheet feeding direction and, in response to the column-shaped movable regulating portion being moved to the regulation release position, the column-shaped movable regulating portion recedes from an inclined surface of the fixed slope member.

5. The sheet feeding device according to claim 1, wherein the movable regulating portion is rib-shaped and is disposed to abut against middle portions of leading edges of the sheets supported by the sheet supporting portion.

6. The sheet feeding device according to claim 5, wherein fixed slope members are arranged on both sides of the rib-shaped movable regulating portion.

7. An image forming apparatus including an image forming portion configured to form an image on a sheet fed by a sheet feeding device, the image forming apparatus comprising:
the sheet feeding device, wherein the sheet feeding device includes:
a sheet supporting portion configured to support a sheet;
a sheet feeding portion configured to feed an uppermost sheet of sheets supported by the sheet supporting portion,
a movable regulating portion disposed downstream of the sheets supported by the sheet supporting portion in a sheet feeding direction such that the movable regulating portion is configured to be positioned a regulation position, where the movable regulating portion regulates movement of the sheets in the sheet feeding direction, moved to fall forward from the regulation position to release regulation of the sheets, and then positioned at a regulation release position, where the movable regulating portion does not regulate the movement of the sheets in the sheet feeding direction, and
a movement mechanism configured to move the movable regulating portion between the movable regulating portion and the regulation release position, wherein, while the movable regulating portion regulates the movement of the sheets in the regulation position, the sheet feeding portion is operated to form a loop in the uppermost sheet between the sheet feeding portion and the movable regulating portion and, after the loop has been formed, the movable regulating portion is moved to fall toward a paper feeding-direction downstream side to remove the loop formed in the uppermost sheet and, after removal of the loop, the movable regulating portion is returned from the regulation release position towards the regulation position such that the movable regulating portion raises a leading end of the uppermost sheet to separate the uppermost sheet from other sheets,
wherein the movement mechanism comprises a cam for moving the movable regulation portion between the regulation position and the regulation release position by being rotated with driving power from a driving source.

8. The image forming apparatus according to claim 7, wherein the sheet feeding device further includes a sheet edge pressing portion disposed downstream of the sheets supported by the sheet supporting portion in the sheet feeding direction such that the sheet edge pressing portion is movable between a pressing position, where the sheet edge pressing portion downwardly presses the leading edge of the uppermost sheet, and a pressing release position, where the sheet edge pressing portion recedes upward to release the pressing of the uppermost sheet, wherein the sheet edge pressing portion is disposed such that the sheet edge pressing portion in the pressing position intersects the movable regulating portion.

9. The image forming apparatus according to claim 7, wherein the sheet feeding device further includes a driving transfer mechanism configured to transfer a driving force from a driving source to the sheet feeding portion, wherein the movable regulating portion is tilted by a tilting cam fixed to a regulating-portion drive gear provided for the driving transfer mechanism.

10. The image forming apparatus according to claim 7, wherein the movable regulating portion is column-shaped, and wherein a fixed slope member is provided for the sheet supporting portion such that the fixed slope member is disposed downstream of the sheet supporting portion in the sheet feeding direction and, in response to the column-shaped movable regulating portion being moved to the regulation release position, the column-shaped movable regulating portion recedes from an inclined surface of the fixed slope member.

11. The image forming apparatus according to claim 7, wherein the movable regulating portion is rib-shaped and is disposed to abut against middle portions of leading edges of the sheets supported by the sheet supporting portion.

12. The image forming apparatus according to claim 11, wherein fixed slope members are arranged on both sides of the rib-shaped movable regulating portion.

13. An image scanning apparatus including an image scanning portion configured to scan an image on a sheet fed by a sheet feeding device, the image scanning apparatus comprising:
the sheet feeding device, wherein the sheet feeding device includes:
a sheet supporting portion configured to support a sheet;
a sheet feeding portion configured to feed an uppermost sheet of sheets supported by the sheet supporting portion,
a movable regulating portion disposed downstream of the sheets supported by the sheet supporting portion in a sheet feeding direction such that the movable regulating portion is configured to be positioned a regulation position, where the movable regulating portion regulates movement of the sheets in the sheet feeding direction, moved to fall forward from the regulation position to release regulation of the sheets, and then positioned at a regulation release position, where the movable regulating portion does not regulate the movement of the sheets in the sheet feeding direction, and
a movement mechanism configured to move the movable regulating portion between the movable regulating portion and the regulation release position, wherein, while the movable regulating portion regulates the movement of the sheets in the regulation position, the sheet feeding portion is operated to form a loop in the uppermost sheet between the sheet feeding portion and the movable regulating portion and, after the loop has been formed, the movable regulating portion is moved to fall toward a paper feeding-direction downstream side to remove the loop formed in the uppermost sheet and, after removal of the loop, the movable regulating portion is returned from the regulation release position towards the regulation position such that the movable regulating portion raises a leading end of the uppermost sheet to separate the uppermost sheet from other sheets,
wherein the movement mechanism comprises a cam for moving the movable regulation portion between the regulation position and the regulation release position by being rotated with driving power from a driving source.

14. The image scanning apparatus according to claim 13, wherein the sheet feeding device further includes a sheet edge pressing portion disposed downstream of the sheets supported by the sheet supporting portion in the sheet feeding direction such that the sheet edge pressing portion is movable between a pressing position, where the sheet edge pressing portion downwardly presses the leading edge of the uppermost sheet, and a pressing release position, where the sheet edge pressing portion recedes upward to release the pressing of the uppermost sheet, wherein the sheet edge pressing portion is disposed such that the sheet edge pressing portion in the pressing position intersects the movable regulating portion.

15. The image scanning apparatus according to claim 13, wherein the sheet feeding device further includes a driving transfer mechanism configured to transfer a driving force from a driving source to the sheet feeding portion, wherein the movable regulating portion is tilted by a tilting cam fixed to a regulating-portion drive gear provided for the driving transfer mechanism.

16. The image scanning apparatus according to claim 13, wherein the movable regulating portion is column-shaped, and wherein a fixed slope member is provided for the sheet supporting portion such that the fixed slope member is disposed downstream of the sheet supporting portion in the sheet feeding direction and, in response to the column-shaped movable regulating portion being moved to the regulation release position, the column-shaped movable regulating portion recedes from an inclined surface of the fixed slope member.

17. The image scanning apparatus according to claim 13, wherein the movable regulating portion is rib-shaped and is disposed to abut against middle portions of leading edges of the sheets supported by the sheet supporting portion.

18. The image scanning apparatus according to claim 17, wherein fixed slope members are arranged on both sides of the rib-shaped movable regulating portion.

19. The sheet feeding device according to claim 1, wherein, after formation of the loop, the sheet feeding portion is configured to be temporarily stopped and the movable regulating portion is configured to be moved to the regulation release position to remove the loop formed in the uppermost sheet.

20. The sheet feeding device according to claim 1, wherein the sheet supporting portion includes a sheet support surface and wherein, while the movable regulating portion regulates the movement of the sheets in the regulation position, the movable regulating portion is set at an angle to the sheet support surface that is smaller than ninety degrees.

21. The sheet feeding device according to claim 1, wherein, after the loop has been formed, the movable regulating portion is configured to be moved to the regulation release position to remove the loop formed in the uppermost sheet such that unfolding of the loop corresponds to movement of the movable regulating portion.

22. The sheet feeding device according to claim 1, wherein the sheet feeding portion is operated to form the loop in the uppermost sheet such that the sheet feeding portion is configured to project the leading end of the uppermost sheet on the downstream of leading edges of a second and any subsequent sheets of the sheets by a distance corresponding to the formed loop.

23. The sheet feeding device according to claim 1, wherein the movement mechanism causes the movable regulation portion to be moved from the regulation release position to the regulation position and also from the regulation position to the regulation release position in a course of rotation of the cam.

24. The sheet feeding device according to claim 1,
wherein the movable regulation portion is biased toward the regulation release position with an elastic member, and
wherein the movement mechanism causes the movable regulation portion to be moved from the regulation position to the regulation release position according to an elastic force of the elastic member by rotating the cam and, by rotating the cam moreover, the movable regulation portion is move from the regulation release position to the regulation position against the elastic force of the elastic member.

25. The sheet feeding device according to claim 1, wherein the sheet feeding device is driven with the driving source for rotating the cam.

26. The sheet feeding device according to claim 25, further comprising:
    a feed gear configured to transmit the driving force of the driving source to the sheet feeding portion; and
    a regulating-portion drive gear configured to transmit the driving force of the driving source to the cam.

\* \* \* \* \*